United States Patent
Hill et al.

(10) Patent No.: US 10,079,518 B2
(45) Date of Patent: Sep. 18, 2018

(54) ROTOR FOR A MOTOR, AND A MOTOR AND AN APPLIANCE COMPRISING THE ROTOR, AND A METHOD FOR MAKING A ROTOR

(71) Applicant: Fisher & Paykel Appliances Limited, East Tamaki, Auckland (NZ)

(72) Inventors: Gregory Paul Hill, Auckland (NZ); Russell Joseph Jackson, Auckland (NZ)

(73) Assignee: FISHER & PAYKEL APPLIANCES LIMITED, Auckland (NZ)

( * ) Notice: Subject to any disclaimer, the term of this patent is extended or adjusted under 35 U.S.C. 154(b) by 0 days.

(21) Appl. No.: 15/723,634

(22) Filed: Oct. 3, 2017

(65) Prior Publication Data
US 2018/0026489 A1 Jan. 25, 2018

Related U.S. Application Data

(60) Division of application No. 15/087,741, filed on Mar. 31, 2016, now Pat. No. 9,806,581, which is a
(Continued)

(51) Int. Cl.
*H02K 5/04* (2006.01)
*H02K 15/14* (2006.01)
(Continued)

(52) U.S. Cl.
CPC .............. *H02K 5/04* (2013.01); *D06F 37/30* (2013.01); *D06F 39/12* (2013.01); *H02K 1/30* (2013.01);
(Continued)

(58) Field of Classification Search
CPC ................ H02K 1/2786; H02K 15/14; H02K 5/00–5/26; H02K 15/00–15/165
(Continued)

(56) References Cited

U.S. PATENT DOCUMENTS 4,233,535 A * 11/1980 Barone .................... H02K 5/10 29/596
4,631,433 A * 12/1986 Stokes ..................... H02K 5/15 310/43
(Continued)

FOREIGN PATENT DOCUMENTS

CN 1954110 A 4/2007
CN 101752920 A 6/2010
(Continued)

OTHER PUBLICATIONS

International Search Report; PCT/NZ2011/000121; dated Sep. 14, 2011; 4 pages.

*Primary Examiner* — Thomas Truong
(74) *Attorney, Agent, or Firm* — Knobbe, Martens, Olson & Bear LLP

(57) ABSTRACT

A rotor for a motor comprising a frame having a hub for connecting the rotor to a shaft and a perimeter portion for interacting with a stator of the motor to cause the rotor to rotate about an axis of rotation. The frame comprises legs extending from an outer portion of the frame towards the hub, each leg having an inner end at the hub and an outer end at the outer portion of the frame, the inner ends of a first plurality of legs being spaced from the inner ends of a second plurality of legs in a direction along the axis of rotation.

20 Claims, 14 Drawing Sheets

Related U.S. Application Data continuation of application No. 13/805,984, filed as application No. PCT/NZ2011/000121 on Jun. 27, 2011, now Pat. No. 9,325,210.

(60) Provisional application No. 61/358,746, filed on Jun. 25, 2010, provisional application No. 61/376,335, filed on Aug. 24, 2010.

(51) Int. Cl.
*D06F 37/30* (2006.01)
*D06F 39/12* (2006.01)
*H02K 5/02* (2006.01)
*H02K 1/30* (2006.01)
*H02K 1/27* (2006.01)

(52) U.S. Cl.
CPC ............... *H02K 5/02* (2013.01); *H02K 15/14* (2013.01); *B60L 2220/14* (2013.01); *B60L 2220/16* (2013.01); *B60L 2220/44* (2013.01); *B60L 2220/50* (2013.01); *H02K 1/2786* (2013.01); *H02K 1/2793* (2013.01); *Y02T 10/641* (2013.01)

(58) Field of Classification Search
USPC .............. 310/400–433, 89, 90, 91, 51, 67 R; 29/596
See application file for complete search history.

(56) References Cited

U.S. PATENT DOCUMENTS

| | | | |
|---|---|---|---|
| 5,862,686 A | 1/1999 | Skrippek | |
| 5,907,206 A * | 5/1999 | Shiga | H02K 1/2786 310/156.05 |
| 6,376,952 B1 | 4/2002 | Stenta | |
| 6,494,430 B2 * | 12/2002 | Takakura | B60H 1/00521 248/562 |
| 6,510,716 B1 | 1/2003 | Kim et al. | |
| 7,262,526 B2 | 8/2007 | Shiga et al. | |
| 9,325,210 B2 | 4/2016 | Hill et al. | |
| 9,806,581 B2 | 10/2017 | Hill et al. | |
| 2007/0113598 A1 | 5/2007 | Jun et al. | |
| 2007/0138902 A1 | 6/2007 | Ahn et al. | |
| 2016/0218581 A1 | 7/2016 | Hill et al. | |

FOREIGN PATENT DOCUMENTS

| | | |
|---|---|---|
| EP | 1233503 | 8/2002 |
| EP | 1548171 | 6/2005 |
| EP | 15848171 | 6/2005 |
| JP | H08-322220 A | 12/1996 |

* cited by examiner

ROTOR FOR A MOTOR, AND A MOTOR AND AN APPLIANCE COMPRISING THE ROTOR, AND A METHOD FOR MAKING A ROTOR

CROSS-REFERENCE TO RELATED APPLICATIONS

This is a divisional of U.S. patent application Ser. No. 15/087,741, filed Mar. 31, 2016, which is a continuation of U.S. patent application Ser. No. 13/805,984, filed Dec. 20, 2012, which is a national phase of International Application No. PCT/NZ2011/000121, filed Jun. 27, 2011, which claims priority from U.S. Patent Provisional Application No. 61/358,746, filed Jun. 25, 2010 and U.S. Provisional Application No. 61/376,335, filed Aug. 24, 2010.

BACKGROUND OF THE INVENTION

Field of the Invention

The present invention relates to electric motors, and particularly motors of a type that are used as the main drive motor for a domestic laundry.

Description of the Related Art

EP 1548171 describes a drive system for washing machines. The drive system comprises a motor with a large diameter shallow stator and a rotor with magnets external to the stator. The stator is supported on the end of a washing tub as shown in FIG. 2 of that application. The stator has an aperture for a drive shaft to pass through. As shown in FIGS. 2 and 16 of EP patent application 1548171, a rotor, which is to be fixed to the drive shaft for driving the rotating drum of a washing machine, has a ring of permanent magnet material supported on the inside of a steel backing ring. A frame extends between the hub of the rotor (through which the shaft can extend) and the steel backing ring. The backing ring and frame may be formed together. The permanent magnet material is made of a set of curved permanent magnet elements. The permanent magnet material is magnetised after physical construction of the rotor. A typical rotor has more than 30 poles magnetised into the ring of magnetic material. The polarity of the poles alternates proceeding around the ring.

The rotor as shown in FIG. 16 of EP 1548171 includes cooling fins 42 and a radial embossing 43 at a predetermined position between adjacent fins. The fins are cut and bent from predetermined positions of a horizontal surface of the rotor frame for blowing air during rotation of the rotor 40, to cool and dehumidify the motor. Each embossing reinforces the rotor frame 41. The embossings 43 can be formed by a pressing operation.

SUMMARY OF THE INVENTION

It is an object of the present invention to provide an improved rotor or a motor with such a rotor, or an appliance that uses such a motor or rotor, or to at least provide the industry with a useful choice.

In one aspect the present invention consists in a rotor for a motor comprising a hub for connecting the rotor to a shaft, a perimeter portion for interacting with a stator of the motor to cause the rotor to rotate about an axis of rotation, and a frame between the hub and the perimeter portion, wherein the frame comprises legs extending from the hub outwards towards the perimeter portion, each leg having an inner end at the hub, the inner ends of a first plurality of legs being axially spaced from the inner ends of a second plurality of legs.

Preferably the frame is metal and the first plurality of legs or the second plurality of legs or both are bent from the frame to axially space the inner ends of the first plurality of legs from the inner ends of the second plurality of legs.

Preferably the hub comprises a reinforcing member for coupling the rotor to the shaft and over-moulded plastic material to couple the inner end of each leg to the reinforcing member.

Preferably the first plurality of legs and the second plurality of legs are interleaved, a leg from the first plurality of legs being adjacent to and between two legs from the second plurality of legs.

Preferably the frame comprises an annular outer portion between an outer end of the legs and the perimeter portion of the rotor, the legs extending between the hub and the annular outer portion.

Preferably the first plurality of legs and the second plurality of legs diverge from the outer portion of the frame at a common axial position of the outer portion of the frame.

Preferably the first plurality of legs have their inner end spaced to one side of the outer portion of the frame, and the second plurality of legs have their inner end spaced to the other side of the outer portion of the frame.

Preferably the frame comprises a ring joining the inner ends of the plurality of first legs together or the inner ends of the plurality of second legs together.

Preferably the hub comprises a reinforcing member coupled to the inner ends of the legs for coupling the rotor to the shaft, the reinforcing member comprising a shoulder on an outer circumference for seating against a surface of the ring to position the reinforcing member axially with respect to the frame.

Preferably the hub comprises a reinforcing member coupled to the inner ends of the legs for coupling the rotor to the shaft, and an outer circumference of the reinforcing member bears against an inner circumference of the ring to position the reinforcing member radially with respect to the frame.

Preferably each leg bent from the frame is bent at a fold line and the frame comprises an embossing at each fold line, the embossing bridging between the outer portion of the frame and the leg.

Preferably the frame is formed from sheet metal, the legs being formed in one or more stamping, pressing or bending operations.

Preferably the frame is formed from steel.

Preferably the frame is formed from a single blank of sheet material with the plurality of first legs interleaved with the plurality of second legs.

Preferably the frame comprises two parts, a first part having the first plurality of legs and a second part having the second plurality of legs.

Preferably outer ends of the first plurality of legs and outer ends of the second plurality of legs are over-moulded together with plastic at the rotor perimeter portion.

Preferably the first part comprises a ring joining the inner ends of the plurality of first legs together and the second part comprises a ring joining the outer ends of the plurality of second legs together, or the first part comprises a ring joining the outer ends of the plurality of first legs together and the second part comprises a ring joining the inner ends of the plurality of second legs together.

Preferably the legs are arranged radially about the hub.

Preferably the hub comprises a reinforcing member coupled to the inner ends of the legs for coupling the rotor to the shaft and the reinforcing member is formed of metal and contacts the frame.

Preferably an inner circumference of the hub has splines for rotationally coupling the rotor to a shaft comprising corresponding splines.

Preferably the rotor is an outside rotor for surrounding an inside stator, the rotor having a cylindrical side wall extending axially from the frame for mounting rotor elements for interacting with the stator to cause the rotor to rotate about the axis of rotation.

Preferably the cylindrical side wall is metal and is integrally formed with the frame.

Preferably the cylindrical side wall is plastic over moulded to a perimeter of the frame.

Preferably the frame and hub are integrally formed of plastic.

Preferably the frame and the cylindrical side wall are integrally formed of plastic.

Preferably the hub, frame and cylindrical side wall are integrally formed of plastic.

Preferably the second plurality of legs are in plane with the outer portion of the frame, the first plurality of legs formed to have their inner ends spaced axially toward a corresponding stator side of the rotor.

Preferably the hub comprises a reinforcing member for coupling the rotor to the shaft and overmoulded plastic to couple the reinforcing member to the frame.

Preferably the rotor is for a brushless DC motor and the cylindrical side wall of plastic encapsulates a backing ring and magnets located at an inside of the backing ring.

Preferably the frame comprises a member radially spaced from the hub and located in between the inner ends and the outer ends of the first and second plurality of legs, the member extending circumferentially around the hub, the member connecting between the first plurality of legs and the second plurality of legs at a radial position intermediate between the inner ends of the legs and the outer ends of the legs.

In another aspect the present invention consists in a motor comprising a stator and a rotor as described above.

In another aspect the present invention consists in a laundry machine comprising a tub, a drum rotationally mounted inside the tub, a drive shaft, and a motor for driving rotation of the drum via the shaft comprising a stator fixed relative to the tub and a rotor coupled to the shaft, the rotor as described above.

In another aspect the present invention consists in a method of manufacturing a rotor comprising a hub for connecting the rotor to a shaft, a perimeter portion for interacting with a stator of the motor to cause the rotor to rotate about an axis of rotation, and a frame between the hub and the perimeter portion, the method comprising the steps of: i) stamping the frame from a sheet of metal to form legs, each leg extending outwardly from an inner end to be attached to the hub towards the perimeter portion, ii) bending a first plurality of legs or a second plurality of legs or both from the frame so that the inner ends of the first plurality of legs are axially spaced from the inner ends of the second plurality of legs, iii) attaching the hub to the inner ends of the legs.

Preferably step ii) comprises the steps of: ii)a) placing the inner ends of the legs in a mould cavity, ii)b) injecting plastic into the cavity to overmould the inner ends of the legs together at the hub, ii)c) releasing the frame from the mould, the hub being formed at least from the plastic.

Preferably step iii) comprises the steps of: iii)a) placing the inner ends of the legs and a reinforcing member for coupling the rotor to the shaft into a mould cavity, iii)b) injecting plastic into the cavity to overmould the inner ends of the legs and the reinforcing member together at the hub, iii)c) releasing the frame and the reinforcing member from the mould, the reinforcing member and plastic forming the hub.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described by way of example only and with reference to the drawings.

DETAILED DESCRIPTION OF THE PREFERRED EMBODIMENT

Figure 1:
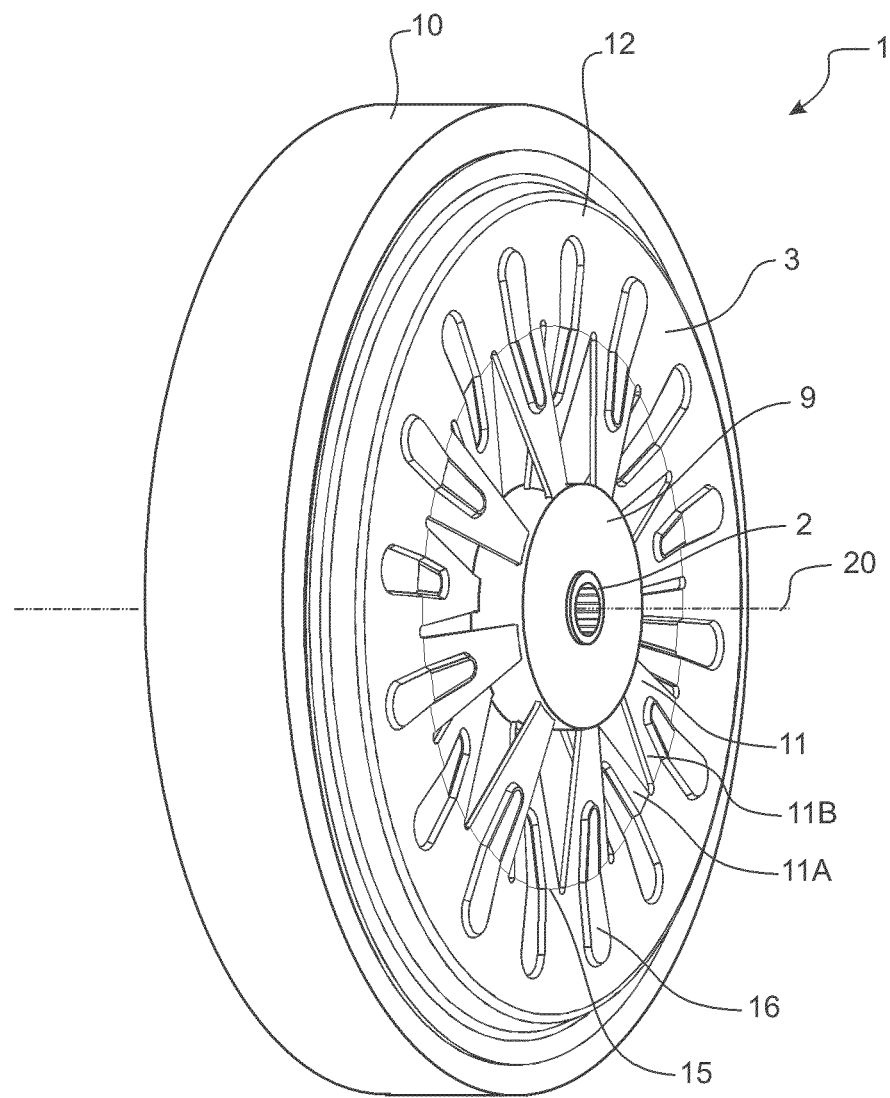
FIG. 1 shows a rotor according to one embodiment of the present invention.
Figure 2:
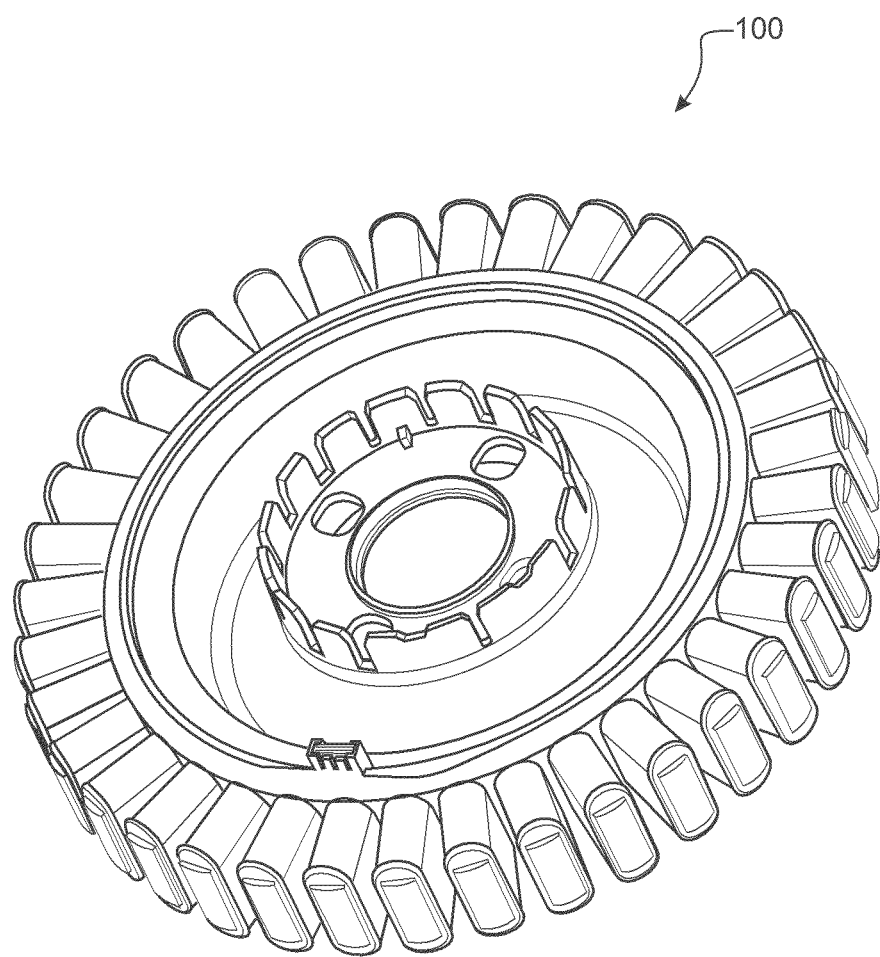
FIG. 2 shows a stator that may be used together with the rotor of FIG. 1 to form a motor according to one embodiment of the present invention.

In one embodiment of the invention, a rotor 1 is provided as shown in FIG. 1. The rotor 1 is used in a motor together with a stator 10 as known in the art. An example of a typical stator 100 is shown in FIG. 2.

Figure 5:
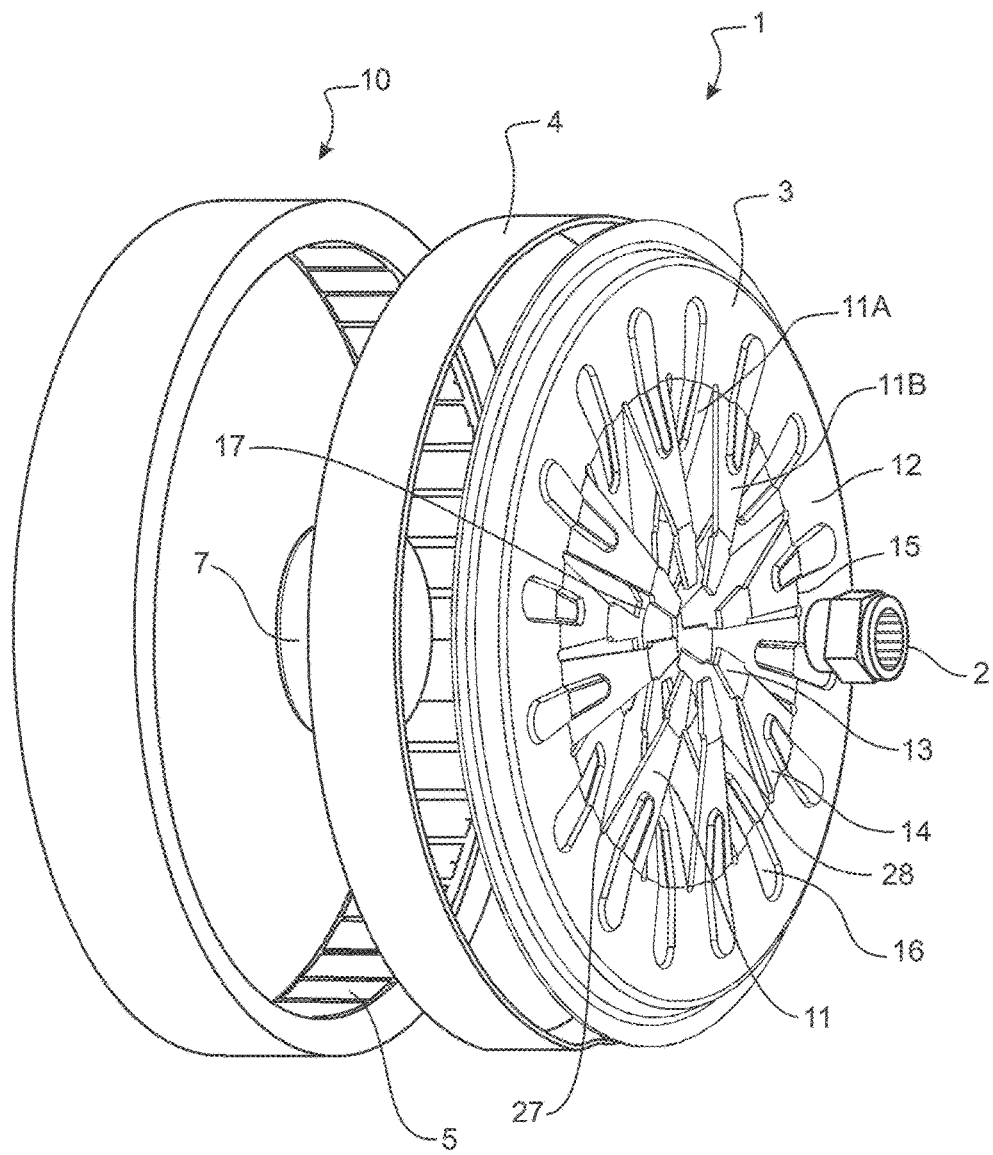
FIG. 5 is an exploded view of the rotor of FIG. 1.

The rotor of one embodiment of a rotor according to the present invention is described with reference to FIGS. 1, 3 and 5. The rotor comprises a cylindrical side wall 10 and an end wall or frame 3. Permanent magnets 5 are located at a perimeter of the frame. Preferably the magnets 5 are located at an inner circumference of the side wall to be positioned outside the poles of the stator when the rotor is in use in a motor. Preferably the magnets are located at an inner circumferential surface of the rotor side wall.

The frame 3 spans between the rotor cylindrical side wall 10 and a hub 9. The hub provides a means to mount the rotor to a shaft for driving a driven component of a machine, for example the laundry drum in a laundry machine. In use the rotor rotates relative to the stator about an axis of rotation 20.

The hub 9 connects the rotor 1 to a drive shaft. The frame comprises a plurality of legs 11 extending from an outer portion 12 of the frame 3 towards the hub 9. Each leg has an inner end 13 at the hub and an outer end 14 at the outer portion of the frame. The legs are arranged at the hub so that the inner ends of a first plurality of legs 11a are spaced from the inner ends of a second plurality of legs 11b in a direction along the axis of rotation 20. The inner ends of the legs are fixed to the hub.

The legs provide a rigid connection between the hub and the frame, and provide rigidity to the frame to prevent or resist bending or flexing of the frame. Spacing the inner ends of the legs axially apart at the hub provides rigidity to the frame to prevent or resist bending or flexing of the frame, compared to a frame where an inner portion of the frame is attached to the hub at a single axial position only, for example as shown in FIG. 1 of U.S. Pat. No. 6,474,114. A rigid frame is desirable to ensure the elements of the rotor that magnetically interact with poles of the stator are positioned accurately relative to the stator.

The illustrated embodiment has the inner ends of the first plurality of legs spaced to one side of the outer portion of the frame, and the inner ends of the second plurality of legs spaced to the other side of the outer portion of the frame. This allows the hub 9 to be positioned approximately in plane with the outer portion 12 of the frame if this is desired for a particular motor arrangement. Alternatively, it may be desirable to position the hub towards an outer side of a motor assembly, in which case the first plurality of legs 11a could be arranged in plane with the outer portion 12 of the frame, and the second plurality of legs 11b formed to have their inner ends spaced axially away from a corresponding stator. Alternatively, it may be desirable to position the hub towards an inner side of a motor assembly, in which case the second plurality of legs 11b could be arranged in plane with the outer portion 12 of the frame, and the first plurality of legs 11a formed to have their inner ends spaced axially toward a corresponding stator.

The inner ends 13 of the legs are preferably rigidly fixed to the hub. The legs could be welded, fixed with fasteners, bonded or otherwise fixed to the hub. In the preferred embodiment the legs are over-moulded in a plastic portion of the hub 9. Preferably the hub 9 comprises a reinforcing member 2 for coupling the rotor to a shaft and over-moulded plastic material 7 to couple the inner end of each leg to the reinforcing member. For example, as shown the reinforcing member 2 comprises splines 8 at an inner circumference of the reinforcing member for rotationally coupling the rotor to a shaft comprising corresponding mating splines. Alternatively the reinforcing member may be keyed to the shaft or otherwise rotationally coupled to the shaft.

Figure 6C:
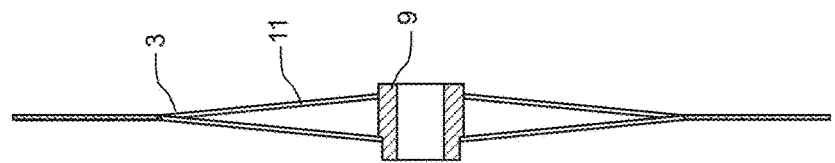
FIGS. 6A to 6C are part views of rotors according to alternative embodiments of the present invention.
Figure 6B:
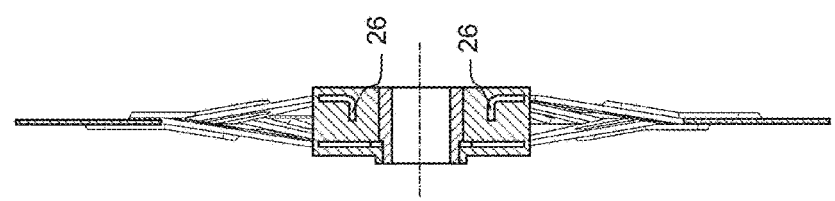
Figure 6A:
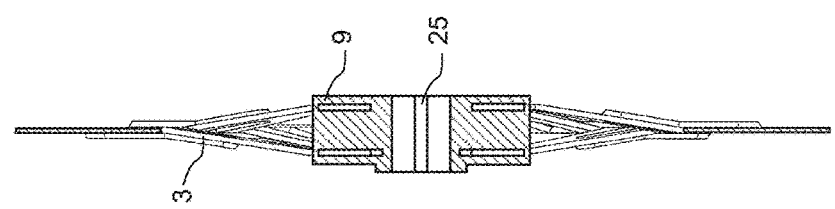

Alternatively, the hub 9 may comprise a plastic material over-moulded to the inner ends of the legs, an inner circumference of the plastic hub formed to mate with a shaft, as illustrated in the part view of FIG. 6A. Splines or other feature such as a key way 25 formed in the inner circumference of the plastic hub 9 provide for rotational coupling of the hub to a shaft.

Figure 7A:
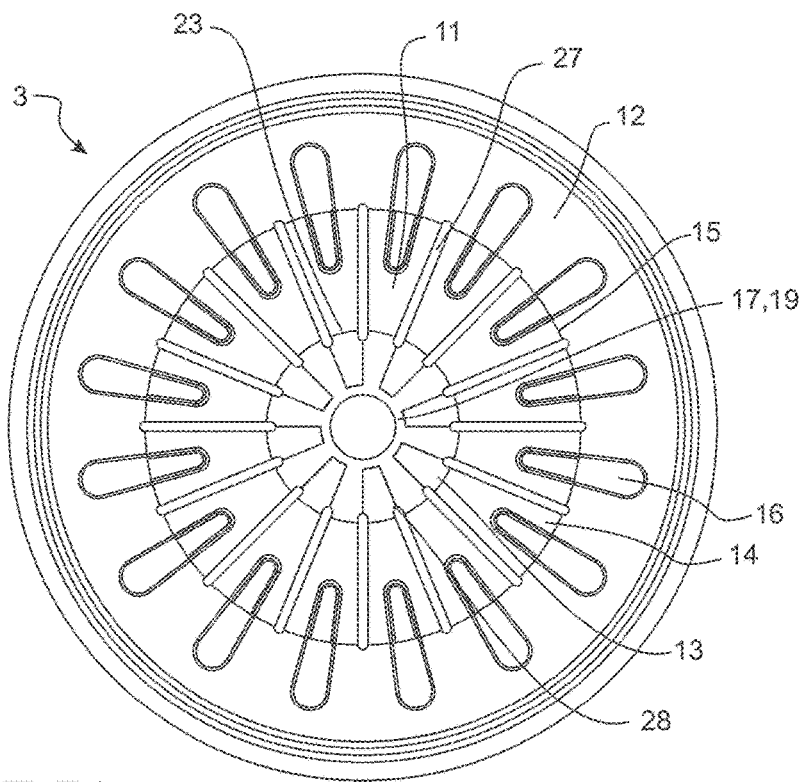
FIGS. 7A to 7C are views of a frame for the rotor of FIG. 1, FIG. 7A being an end view, FIG. 7B being a cross sectional view through a centre of the frame, and FIG. 7C being a perspective view.
Figure 7B:
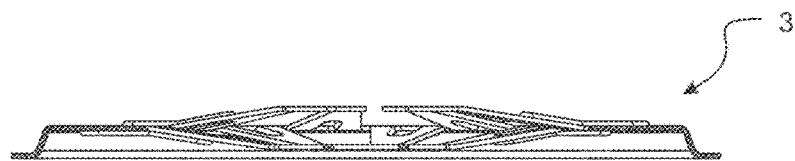
Figure 7C:
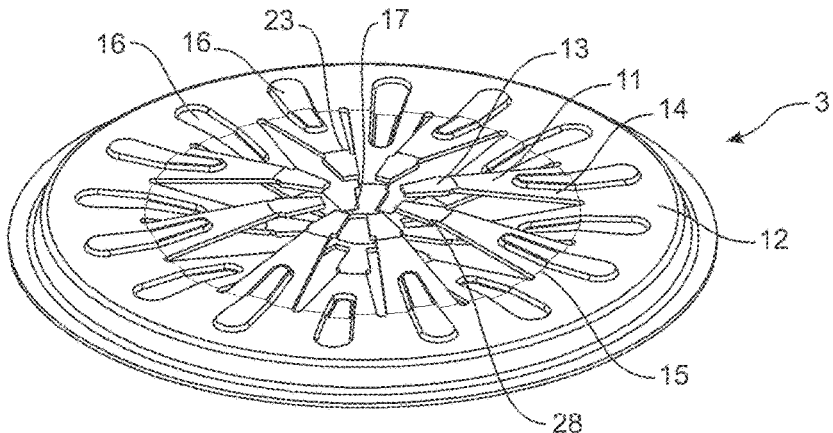

The inner ends of the legs may include features that assist with securing the inner ends of the legs to the plastic hub 9. For example, as shown in FIG. 6B, the ends of the legs may include a portion 26 that extends in an axial direction or at some angle to a plane perpendicular to the axis of rotation. The inner ends of the legs may be shaped to assist with securing the inner ends of the legs to the plastic hub, for example, as best shown in FIG. 7A, the inner ends of the legs include shoulders 28 facing radially outwards. Shoulder 28 on each side of each leg is formed by providing a gap 27 between adjacent legs, for example by removing a sliver of material from between adjacent legs except at the innermost portion of each leg.

In an alternative embodiment as shown in FIG. 6C, the inner ends of the legs may be welded to a hub 9.

As shown in FIGS. 1 and 3 to 5, the first plurality of legs 11a and the second plurality of legs 11b diverge from the outer portion 12 of the frame, to achieve an axial distance between the inner ends of the first plurality of legs and the second plurality of legs at the hub 9. In the illustrated embodiment, the outer end 14 of the legs 11a, 11b are located at the outer portion of the frame 12 at a common axial position of the outer portion of the frame 3. The legs diverge from the outer portion of the frame from a common axial position at the outer portion of the frame 3.

Preferably the frame 3 is formed from sheet metal and the first plurality of legs or the second plurality of legs or both are bent from the frame to space the inner ends of the first plurality of legs from the inner ends of the second plurality of legs in a direction along the axis of rotation. Preferably the frame 3 is formed from sheet metal, for example a sheet of steel, the legs 11 being formed in one or more stamping, pressing or bending operations. In the preferred embodiment each leg bent from the frame is bent at a fold line 15 and the frame includes an embossing 16 at each fold line, the embossing bridging between the outer portion 12 of the frame and the leg 11. The embossing at each bent leg provides rigidity to the leg in an axial direction to assist in maintaining the position of the leg at least during the manufacture of the rotor prior to fixing the inner end of the legs to the hub of the frame. Preferably the embossing 16 is pressed into the metal frame in the same axial direction as the axial direction the leg is bent towards from the outer portion of the frame.

Figure 3:
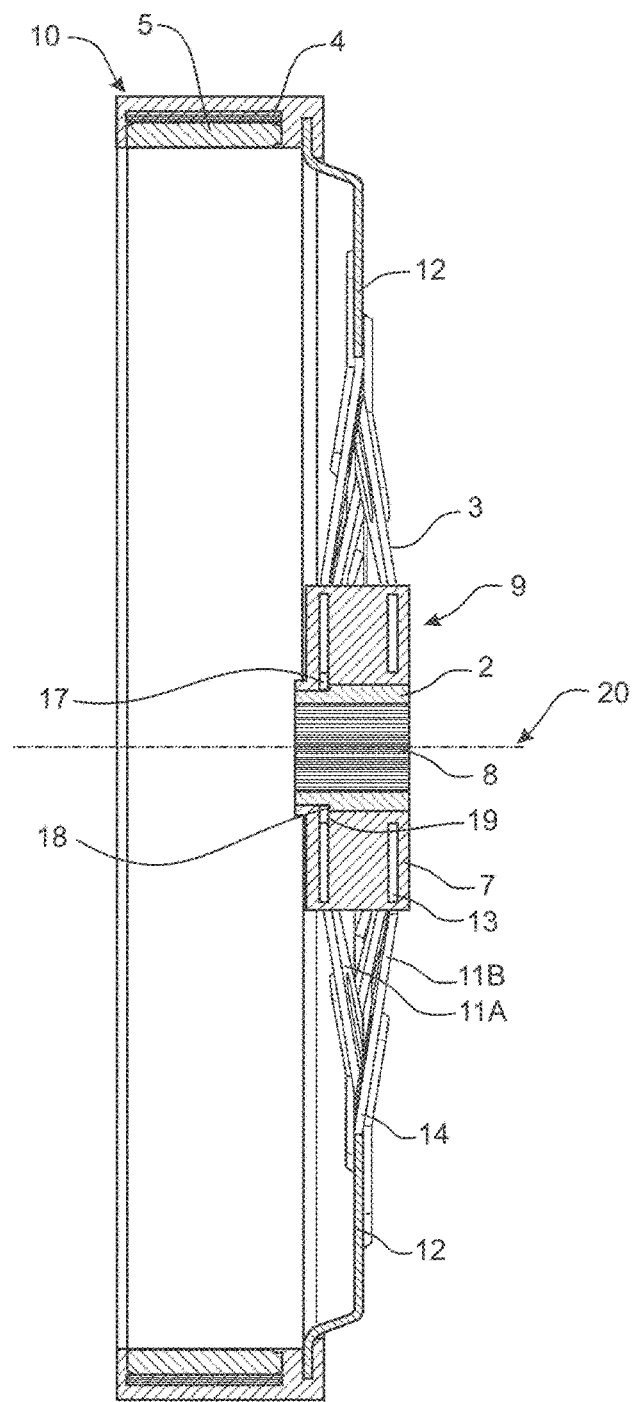
FIG. 3 is a cross sectional view of the rotor of FIG. 1.
Figure 4:
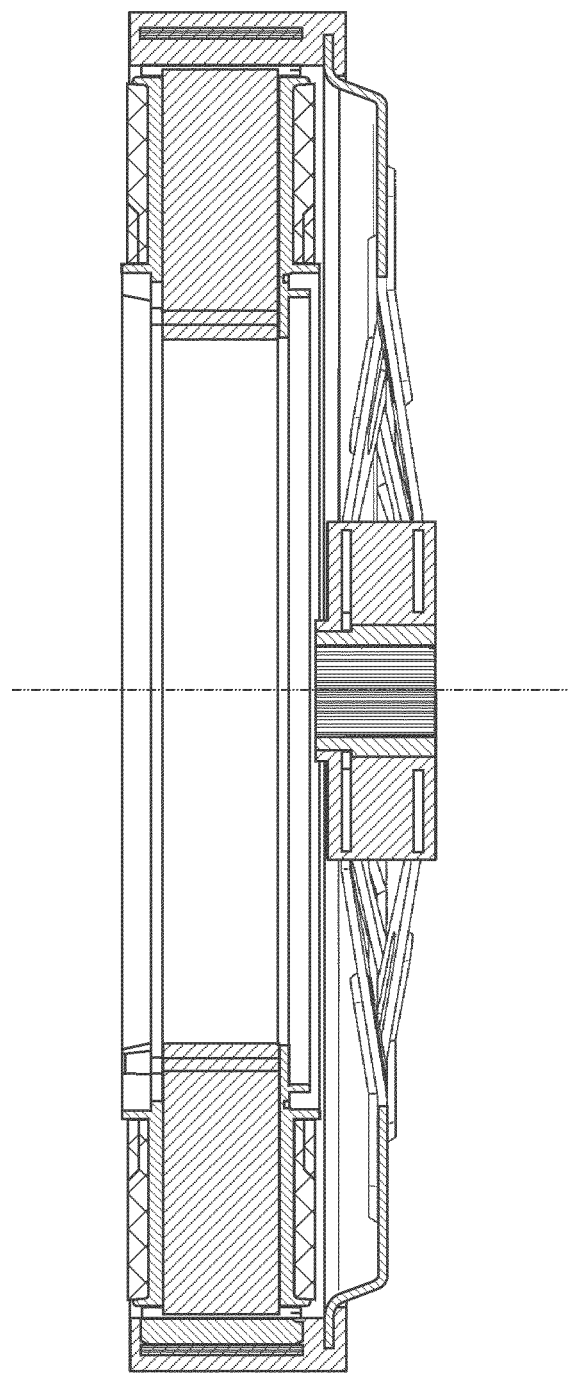
FIG. 4 is a cross sectional view of the rotor of FIG. 1 and a stator, the rotor and stator forming a motor according to one embodiment of the present invention.

As best shown in FIG. 3, the inner ends of the legs are preferably aligned perpendicular to the axis of rotation for attaching to the hub. Where the frame is formed from sheet metal, the inner ends of the legs are folded at a fold line 23 to be perpendicular or at some other angle to the axis of rotation. The frame may comprise an embossing (not shown) at each fold line 23 at the inner end of each leg, to provide rigidity to the leg in an axial direction to assist in maintaining the position of the inner end of the leg at least during the manufacture of the rotor prior to fixing the inner end of the legs to the hub of the frame.

Spacing the inner ends of the legs axially apart at the hub provides rigidity to the frame to prevent or resist bending or flexing of the frame. Any axial distance between the inner ends of a first plurality of legs and a second plurality of legs attached to the hub provides increased rigidity compared to a frame where an inner portion of the frame is attached to the hub at a single axial position only. However, the inner ends of the first plurality of legs are preferably spaced apart from the inner ends of the second plurality of legs by 10 mm to 50 mm for a typical size of rotor required in a motor for driving a rotatable drum in a laundry appliance. For example, a rotor according an embodiment of the present invention and suitable for use in a motor of a laundry appliance may have a hub with an outer diameter of approximately 80 mm, a leg length of approximately 50 mm between the hub and the rotor outer portion 12, and an axial distance between the inner ends of the first plurality of legs and the second plurality of legs of approximately 16 mm. For a typical size of rotor required in a motor for driving a rotatable drum in a laundry appliance, the first plurality of legs and the second plurality of legs preferably diverge from the outer portion of the frame at an angle of approximately 5 degrees to 30 degrees between the legs of the first and second plurality of legs. A typical rotor required in a motor for driving a rotatable drum in a laundry appliance and incorporating the present invention may have an outer diameter of approximately 300 mm, a hub diameter of approximately 80 mm, and a leg length spanning between the hub and the outer portion of the frame of approximately 50 mm, with the inner ends of the first plurality of legs spaced axially from the inner ends of the second plurality of legs by approximately 16 mm.

Preferably there are at least three legs in the first plurality of legs and three legs in the second plurality of legs. Preferably there are three to twelve legs in the first plurality of legs and three to twelve legs in the second plurality of legs. Preferably the number of legs in the first plurality of legs is the same as the number of legs in the second plurality of legs. Preferably the first plurality of legs and the second plurality of legs are interleaved, a leg from the first plurality of legs being adjacent to and between two legs from the second plurality of legs.

A shown in the accompanying Figures, the legs 11 are preferably wider at the outer end 14 and narrower at the inner end 13. The legs 11 are wider at the outer end 14 and narrower at the inner end 13 to utilise the majority of the base material provided for manufacture of the frame, to provide maximum rigidity. However, in an alternative embodiment, the width of the legs may be constant along the length of the legs, the width being determined by a maximum allowable width at the inner end of the legs. Preferably each leg is symmetrical about a radial centre line. Preferably each leg is wedge shaped, the outer end of each leg being wider than the inner end of the leg. Preferably the legs 11 are arranged radially about the hub.

The frame 3 may comprise a ring 17 joining either the inner ends of the plurality of first legs together or the inner ends of the plurality of second legs together. The ring 17 strengthens the frame and the strength of the connection between the hub and the frame compared to a frame without such a ring.

As discussed above, one embodiment of a rotor according to the present invention comprises a hub 9 having a reinforcing member 2 over-moulded to the frame 3. The ring 17 can be used to assist with placement of the reinforcing member 2 relative to the frame 3 during manufacture. For example, the reinforcing member 2 may comprise a shoulder 18 on an outer circumference for seating against an axially facing surface 19 of the ring to position the reinforcing member axially with respect to the frame. The reinforcing member is positioned relative to the frame prior to permanently fixing the reinforcing member to the frame. Furthermore an outer circumference of the reinforcing member may bear against an inner circumference of the ring to position the reinforcing member radially with respect to the frame. Alternatively, where the frame does not include such a ring, the inner end of the legs are preferably dimensioned to contact the reinforcing member to position the reinforcing member relative to the frame prior to permanent fixing of the reinforcing member to the frame. The leg length and outer diameter of the reinforcing member may be chosen so that the outer circumference of the reinforcing member bears against a radially inner facing surface of at least three legs to radially position the reinforcing member 2 relative to the frame 3. The reinforcing member may include an axially facing shoulder on an outer circumference for seating against an axially facing surface of the inner ends of the legs to position the reinforcing member axially with respect to the frame.

Preferably the reinforcing member 2 contacts the frame 3 to assist with positioning the reinforcing member relative to the frame. Preferably the reinforcing member is formed of metal. Preferably the frame is formed of steel. Preferably the reinforcing member is formed of steel.

Figure 8:
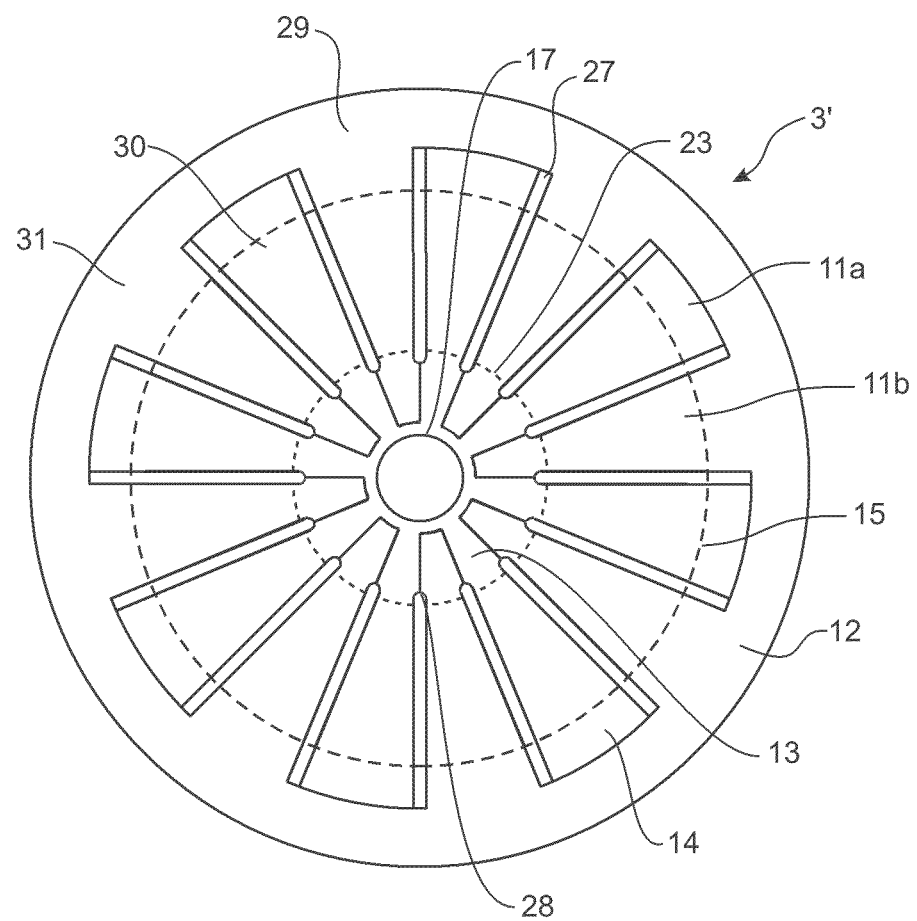
FIG. 8 shows an alternative frame for a rotor according to another embodiment of the present invention.

An alternative frame 3' for a rotor according to an alternative embodiment of the present invention is illustrated in FIG. 8. To assist with an understanding of this alternative frame, edges of the frame are shown as continuous lines and folds in the frame are shown as dashed lines. The frame 3' is formed in two parts, 30 and 31. The first part 30 has a first plurality of legs 11a and the second part 31 has a second plurality of legs 11b. As shown, the first part has a ring 17 joining the inner ends 13 of the plurality of first legs together and the second part comprises a ring 29 joining the outer ends 14 of the plurality of second legs together. The first and second parts are formed together into the rotor at the hub and perimeter portion of the rotor. For example, the inner ends 13 of the first plurality of legs and the inner ends of the second plurality of legs are over moulded together at the hub with plastic, the plastic over-mould forming at least a portion of the hub, and outer ends of the first plurality of legs and outer ends of the second plurality of legs are over-moulded together with plastic at the rotor perimeter portion. In this embodiment, the outer ends 14 of the first plurality of legs can be spaced from the outer ends 14 of the second plurality of legs in a direction along the axis of rotation. Alternatively, the outer ends 14 of the first plurality of legs and the outer ends 14 of the second plurality of legs can diverge from a common axial position.

Figure 6D:
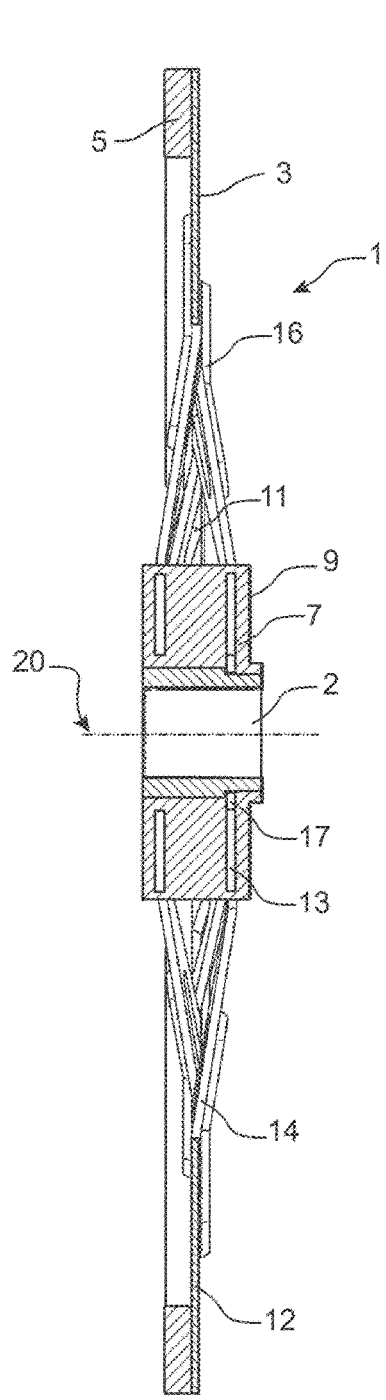
FIGS. 6D and 6E show rotors according to further alternative embodiments of the present invention.

The rotor of the present invention may be used in any type of motor comprising a rotor with a perimeter portion that interacts with a stator of the motor to cause the rotor to rotate relative to the stator about an axis of rotation. For example, a rotor according to the present invention may be used in a motor having an inner rotor and an outer stator, for example as illustrated in FIG. 2A of U.S. Pat. No. 4,998,052. Alternatively, a rotor according to the present invention may be used in a motor having a rotor outside the stator, for example a brushless DC motor as described in relation to FIG. 2 of US 2007/0132323, or an induction motor as described in relation to FIG. 8 of US 2007/0132323. Alternatively, a rotor according to the present invention may be used in a motor wherein elements of the rotor that magnetically interact with the stator are located on an axial side of the rotor frame 3 as illustrated in FIG. 6D, corresponding elements of the stator for magnetically interacting with the rotor elements being arranged beside the rotor in an axial direction.

Figure 6E:
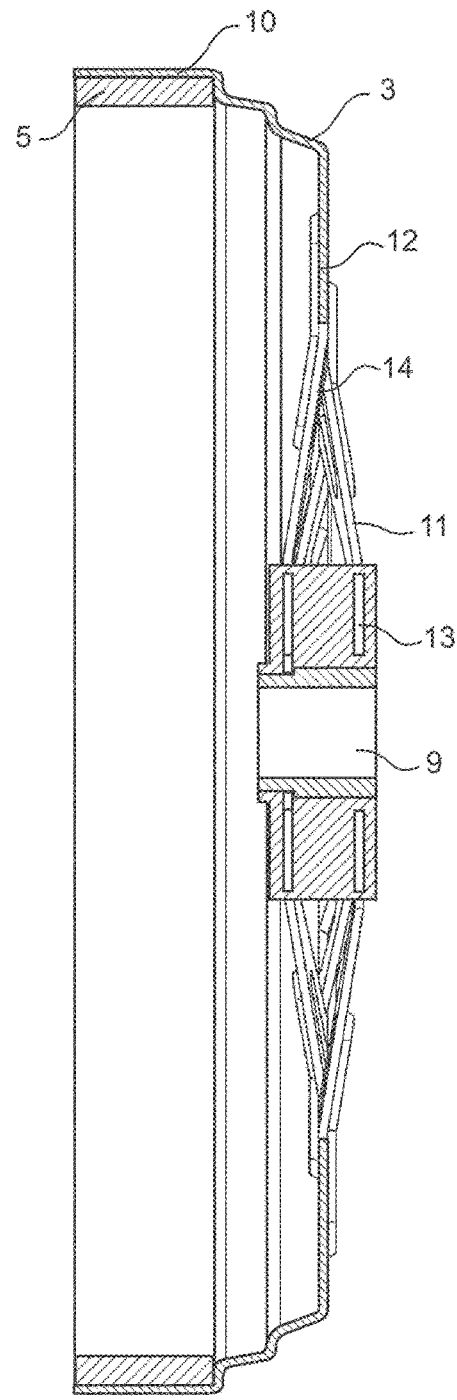

One illustrated embodiment of the present invention shows a rotor for a motor having an outside rotor surrounding an inside stator, the rotor having a cylindrical side wall extending axially from the frame for mounting rotor elements for interacting with the stator to cause the rotor to rotate about the axis of rotation. The cylindrical side wall 10 is formed from plastic and is over moulded to a perimeter of the frame. In an alternative embodiment, the cylindrical side wall could be metal integrally formed with the frame as illustrated in FIG. 6E. For example, the rotor frame and side wall could be pressed from a parent sheet metal.

Figure 9:
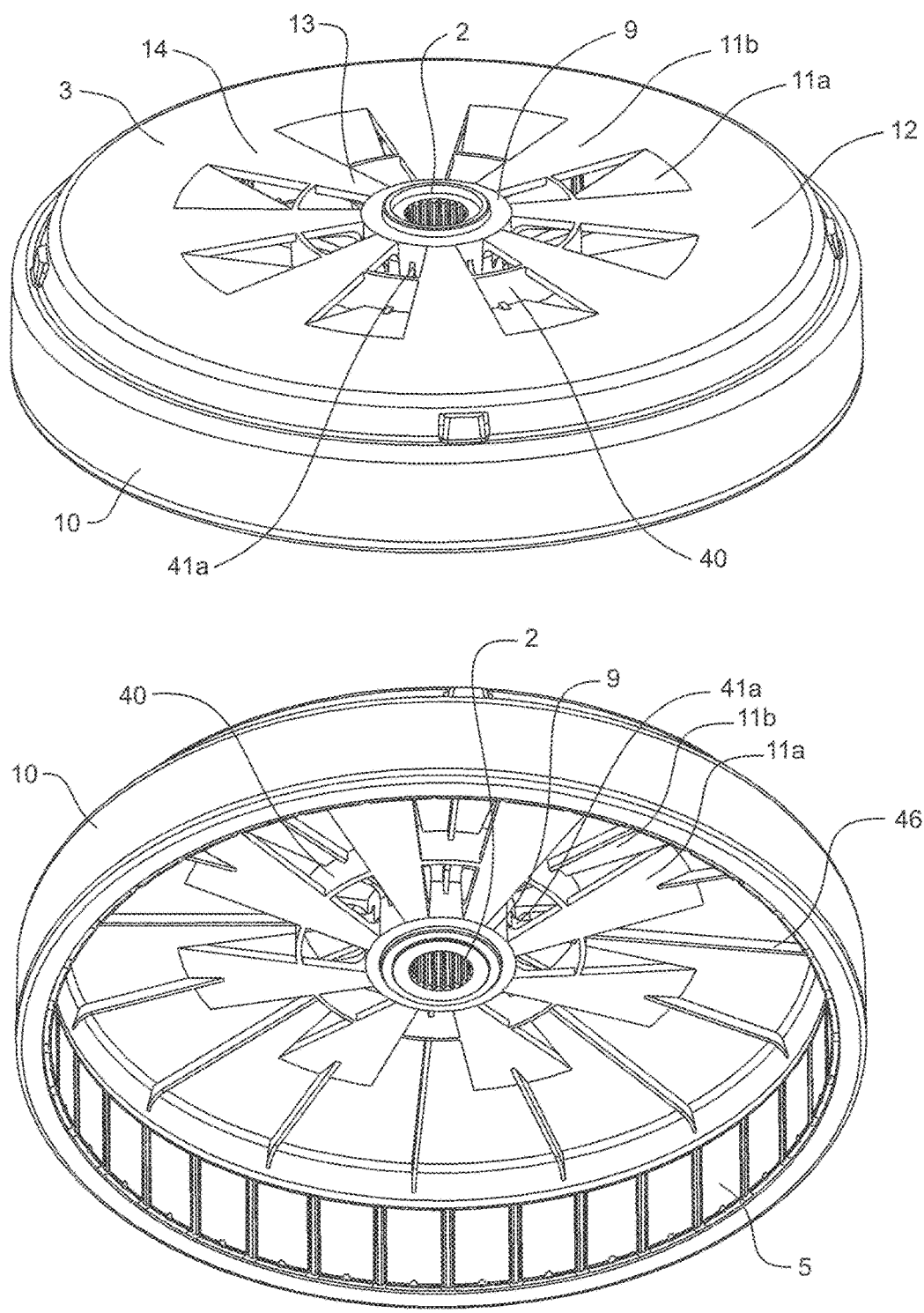
FIG. 9 shows a rotor according to another embodiment of the present invention.
Figure 10:
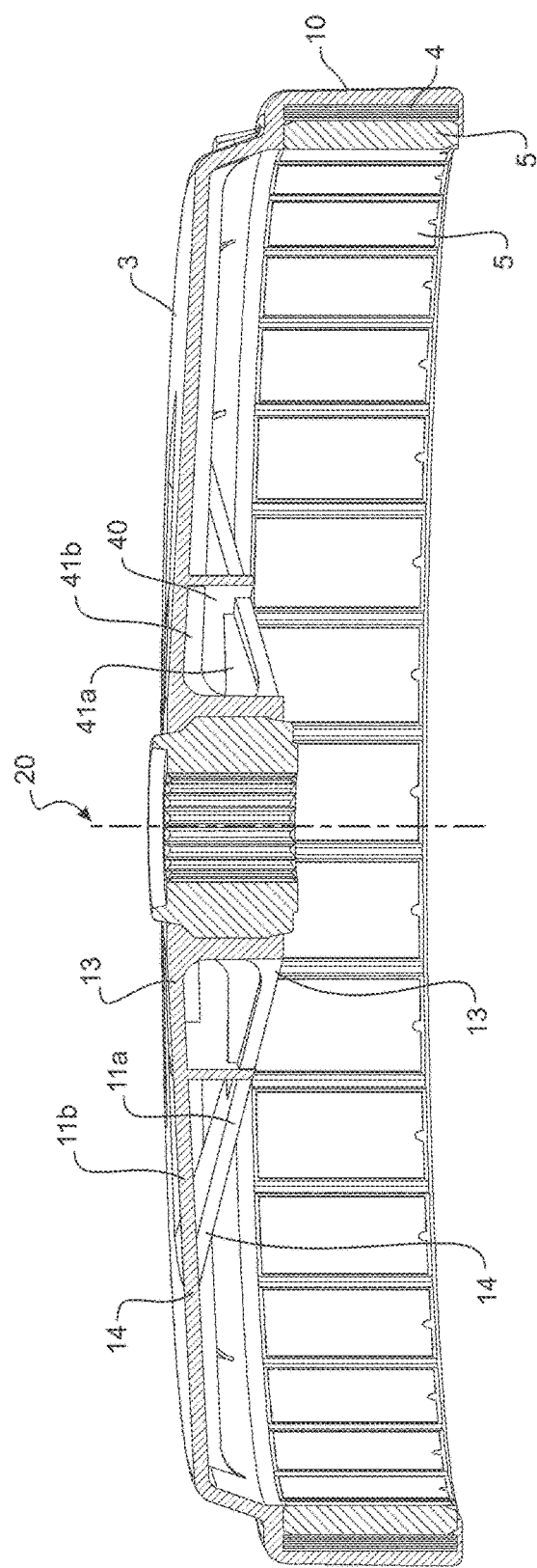
FIG. 10 is a cross sectional view of the rotor of FIG. 9.

A rotor according to an alternative embodiment of the present invention is shown in FIGS. 9 and 10. In this embodiment, the rotor comprises a plastic frame extending from the hub of the rotor to the perimeter of the rotor. The frame includes a plurality of legs 11 extending between an outer portion 12 of the frame 3 and the hub 9. The legs are arranged at the hub so that the inner ends of a first plurality of legs are spaced from the inner ends of a second plurality of legs 11b in a direction along the axis of rotation 20, in a similar structure to that of the other embodiments of the present invention described with reference to FIGS. 1 to 8. In the embodiment of FIGS. 9 and 10, the second plurality of legs 11b are arranged in plane with the outer portion 12 of the frame, and the first plurality of legs 11a formed to have their inner ends spaced axially toward a corresponding stator side of the rotor. However, in an alternative rotor, the inner ends of the first plurality of legs may be spaced to one side of the outer portion of the frame and the inner ends of the second plurality of legs may be spaced to the other side of the outer portion of the frame or otherwise, as required by the geometry of a motor. The present invention requires the inner ends of the first plurality of legs to be spaced axially from the inner ends of the second plurality of legs. The axial position of the legs 11 relative to the outer portion or perimeter of the frame is dependent on the particular geometry of the rotor desired for a particular motor assembly.

Preferably the hub 9 and the frame are integrally formed in plastic. Preferably the plastic circumferential side wall of the rotor and the plastic frame are integrally formed in plastic. Preferably the rotor hub, frame and outer circumferential wall are integrally formed in plastic together in a plastic injection moulding process.

The hub may comprise a reinforcing member 2 and plastic, the plastic of the hub overmoulded together with the rotor frame to the reinforcing member 2.

Preferably the rotor frame includes a member 40 radially spaced from the hub in between the inner ends and the outer ends of the first and second plurality of legs and extending circumferentially around the hub. The member connects between the first plurality of legs and the second plurality of legs at a radial position intermediate between the inner ends of the legs and the outer ends of the legs. The circumferential member 40 provides rigidity to the structure of the rotor frame, and assists to prevent or resist bending of the legs 11a and 11b.

Preferably a rib 41a, 41b is provided at each leg 11a, 11b to increase the structural rigidity of the frame. Preferably ribs 41a and 41b extend in the radial direction of the rotor. As shown in FIGS. 9 and 10, preferably each leg 11a of the first plurality of legs has a rib 41a on a side of each leg 11a that faces towards the second plurality of legs 11b. Preferably each leg 11b of the second plurality of legs has a rib 41b on a side of each leg 11b that faces towards the first plurality of legs 11a. The rotor may include other ribs for structural strength, for example, ribs 42 extending from the outer end of each leg of the first plurality of legs to the circumferential wall 10 of the rotor.

The various rotor embodiments illustrated in the accompanying figures are rotors for brushless DC motors. For the embodiments comprising a plastic cylindrical side wall, the cylindrical side wall 10 of plastic encapsulates a metal cylinder or backing ring 4 and magnets 5 located at an inside of the backing ring 4. The backing ring couples the magnetic flux between the magnets and controls the inside radial dimension of the assembled magnets during manufacture. Preferably the backing ring is formed by winding or wrapping a strip of metal into a cylinder until a desired thickness is achieved. The magnets 5 are positioned at an inner circumferential surface of the backing ring and the backing ring and magnets are moulded together by the plastic side wall preferably in an injection moulding process. Preferably the inner surface of the magnets is exposed at an inner circumferential surface of the cylindrical side wall of plastic. For the embodiment of FIGS. 1 and 3 to 5, preferably the backing ring, magnets and frame are moulded together by the plastic side wall preferably in an injection moulding process. For example, the backing ring, magnets and frame may be placed within a mould cavity, plastic then being injected into the mould cavity to mould the frame, magnets and backing ring together. For the embodiment of FIGS. 9 and 10, the plastic side wall 10 is integrally formed in plastic with the frame 3. Preferably the backing ring and magnets are placed within a mould cavity, plastic then being injected into the mould cavity to mould the magnets and backing ring together with the moulded side wall 10 and frame 3. Where the hub includes a reinforcing member 2, preferably the reinforcing member, backing ring and magnets are placed within a mould cavity, plastic then being injected into the mould cavity to mould the magnets and backing ring together with the side wall 10 and mould the reinforcing member into the hub, the frame being integrally formed with the side wall and the hub in the same injection moulding process.

A rotor according to an embodiment of the present invention has legs extending from the hub outwards towards a perimeter of the rotor. Each leg has an inner end at the hub. The inner ends of a first plurality of legs are spaced axially from the inner ends of a second plurality of legs. There are gaps 50 between the first plurality of legs and the second plurality of legs. This construction of rotor provides a structure that allows air pressure to equalise on each side of the rotor frame. As a rotor spins, the rotor can act as a fan, creating a pressure differential across the rotor frame. Prior art rotors include holes in the rotor frame to alleviate a pressure difference across the rotor frame and to allow air to reach the stator to cool the stator windings. Holes added to the rotor can reduce rigidity of the rotor frame which is undesirable. A rotor according to the present invention does not require holes to be provided in the rotor frame as the gaps between adjacent legs of the rotor allows air flow across the rotor frame.

A rotor according to the present invention is rigid for a given amount of material used in the frame construction, as the position of the legs space material away from a neutral axis of the rotor frame. Prior art frames may include ribs for rigidity, but such ribs must be large to provide sufficient rigidity. A rotor with particularly deep ribs can act as a fan and cause a pressure difference across the rotor frame which may be undesirable.

An embodiment of the invention might comprise a washing machine with a motor comprising the rotor as described above, or another embodiment might comprise the motor itself, or the rotor itself. For example, a cross section of a motor comprising a rotor described above is shown in FIG.

4. Alternatively, the rotor could be used in another application, such as a power generation apparatus.

A preferred method for manufacturing a rotor according to one embodiment of the present invention and comprising a hub for connecting the rotor to a shaft, a perimeter portion for interacting with a stator to cause the rotor to rotate about an axis of rotation, and a frame between the hub and the perimeter portion is listed below.

The preferred method comprises the steps of: i) stamping the frame from a sheet of metal to form legs, each leg extending outwardly from an inner end to be attached to the hub towards the perimeter portion, ii) bending a first plurality of legs or a second plurality of legs or both from the frame so that the inner ends of the first plurality of legs are axially spaced from the inner ends of the second plurality of legs, iii) attaching the hub to the inner ends of the legs.

Preferably step ii) comprises the steps of: ii)a) placing the inner ends of the legs in a mould cavity, ii)b) injecting plastic into the cavity to overmould the inner ends of the legs together at the hub, ii)c) releasing the frame from the mould, the hub being formed at least from the plastic.

Preferably step iii) comprises the steps of: iii)a) placing the inner ends of the legs and a reinforcing member for coupling the rotor to the shaft into a mould cavity, iii)b) injecting plastic into the cavity to overmould the inner ends of the legs and the reinforcing member together at the hub, iii)c) releasing the frame and the reinforcing member from the mould, the reinforcing member and plastic forming the hub.

Figure 11:
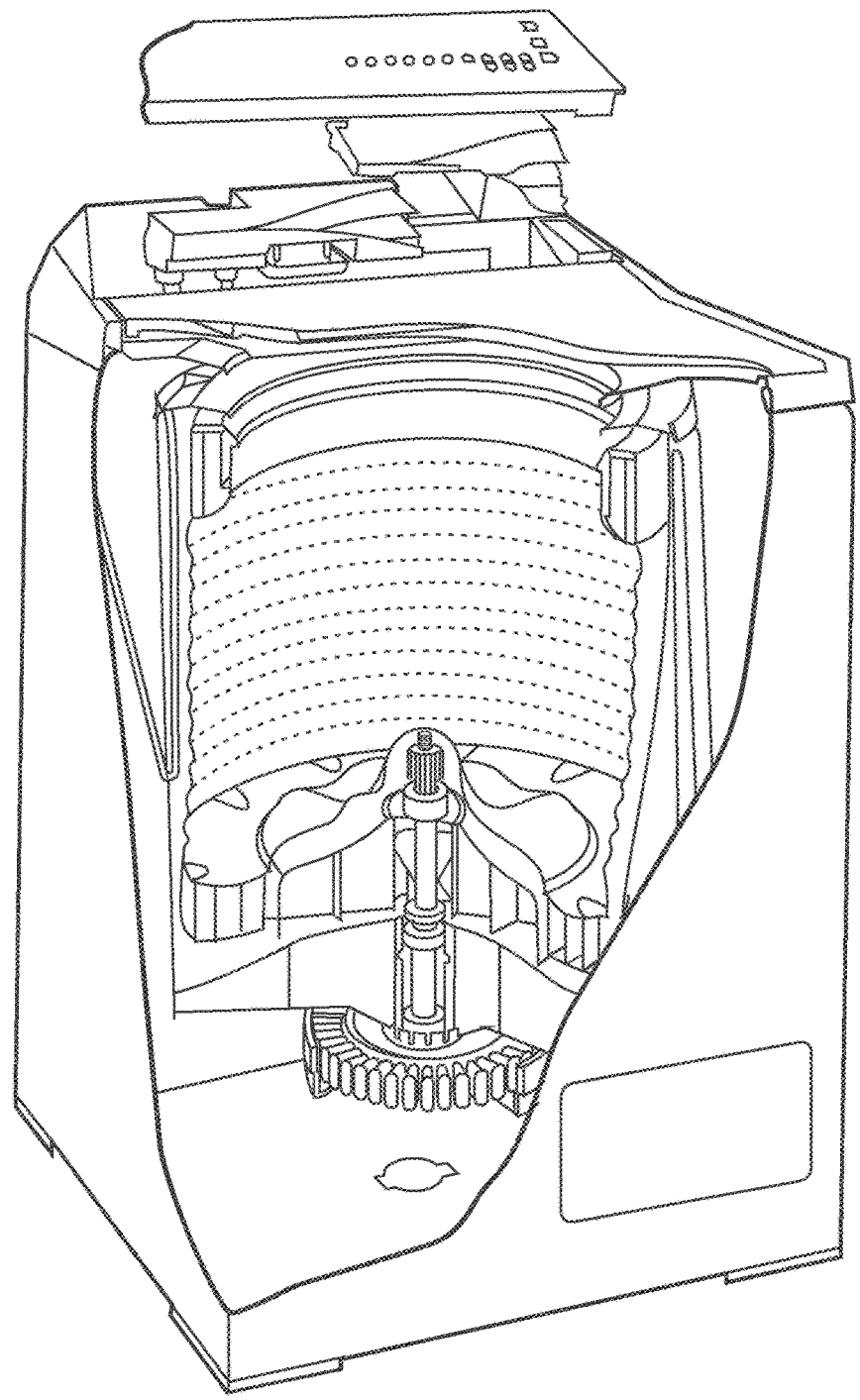
FIG. 11 shows a diagrammatic cutaway view of a washing machine of a vertical axis type that may incorporate a rotor and/or motor according to the present invention.

A laundry machine such as a dryer or a washing machine using the motor described could take one of many forms. For example, referring to FIG. 11, one embodiment comprises a top loading washing machine with an outer wrapper and a tub suspended within the wrapper. A rotating drum with perforated walls is disposed in and rotatable within the suspended tub inside a cabinet. A motor, comprising a stator and rotor as previously described, is coupled to the rotating drum via a rotational shaft. The motor can be operated by a controller to spin and oscillate the rotating drum to carry out washing of clothes.

Figure 12:
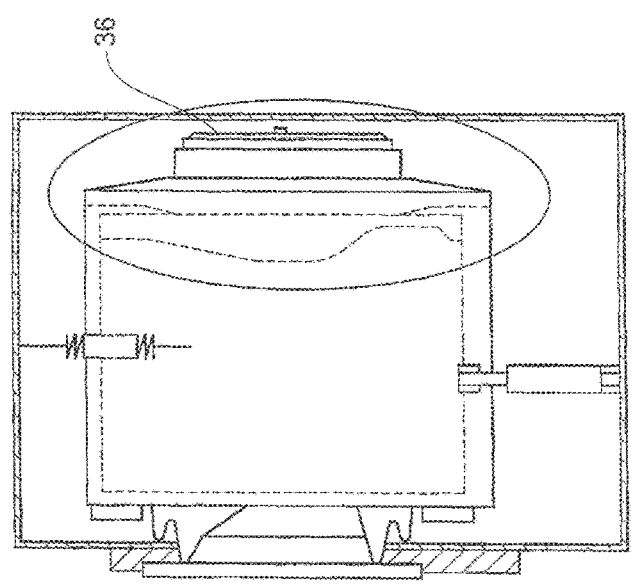
FIG. 12 shows a diagrammatic view of a horizontal axis washing machine with front access that may incorporate the rotor and/or motor according to the present invention.

Referring to FIG. 12, another embodiment comprises a front loading horizontal axis washing machine with an outer wrapper and a rotating drum housing suspended in the outer wrapper. A rotating drum is disposed in and rotatable within the rotating drum housing. A door provides access to the rotating drum for introducing or removing clothing to be washed. A gasket provides a seal between the door and the rotating drum. A motor, comprising a stator and rotor as previously described, is coupled to the rotating drum via a rotational shaft. The motor can be operated by a controller to spin and oscillate the rotating drum to carry out washing of clothes.

Figure 13:
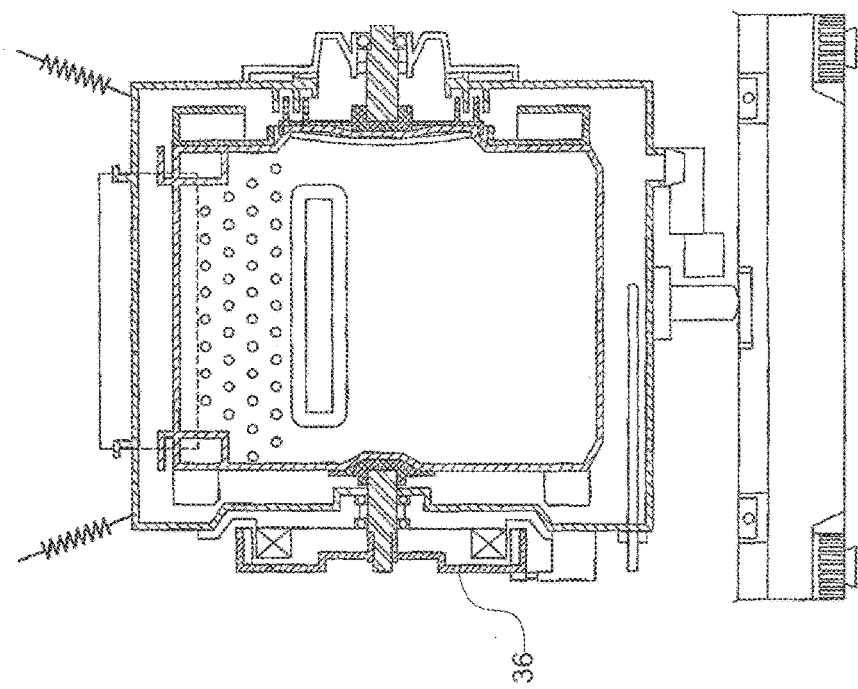
FIG. 13 shows a diagrammatic view of a horizontal axis washing machine with top or tilt access that may incorporate the rotor and/or motor according to the present invention.

Referring to FIG. 13, another embodiment comprises a top loading or tilt access horizontal axis washing machine. The washing machine has an outer wrapper and a tub suspended within the outer wrapper. A rotating drum can rotate within the tub. Clothes can be introduced and taken from the rotating drum through an opening in the top of the drum. A motor, comprising a stator and rotor as previously described, is coupled to the rotating drum via a rotational shaft. The motor can be operated by a controller to spin and oscillate the rotating drum to carry out washing of clothes.

Figure 14:
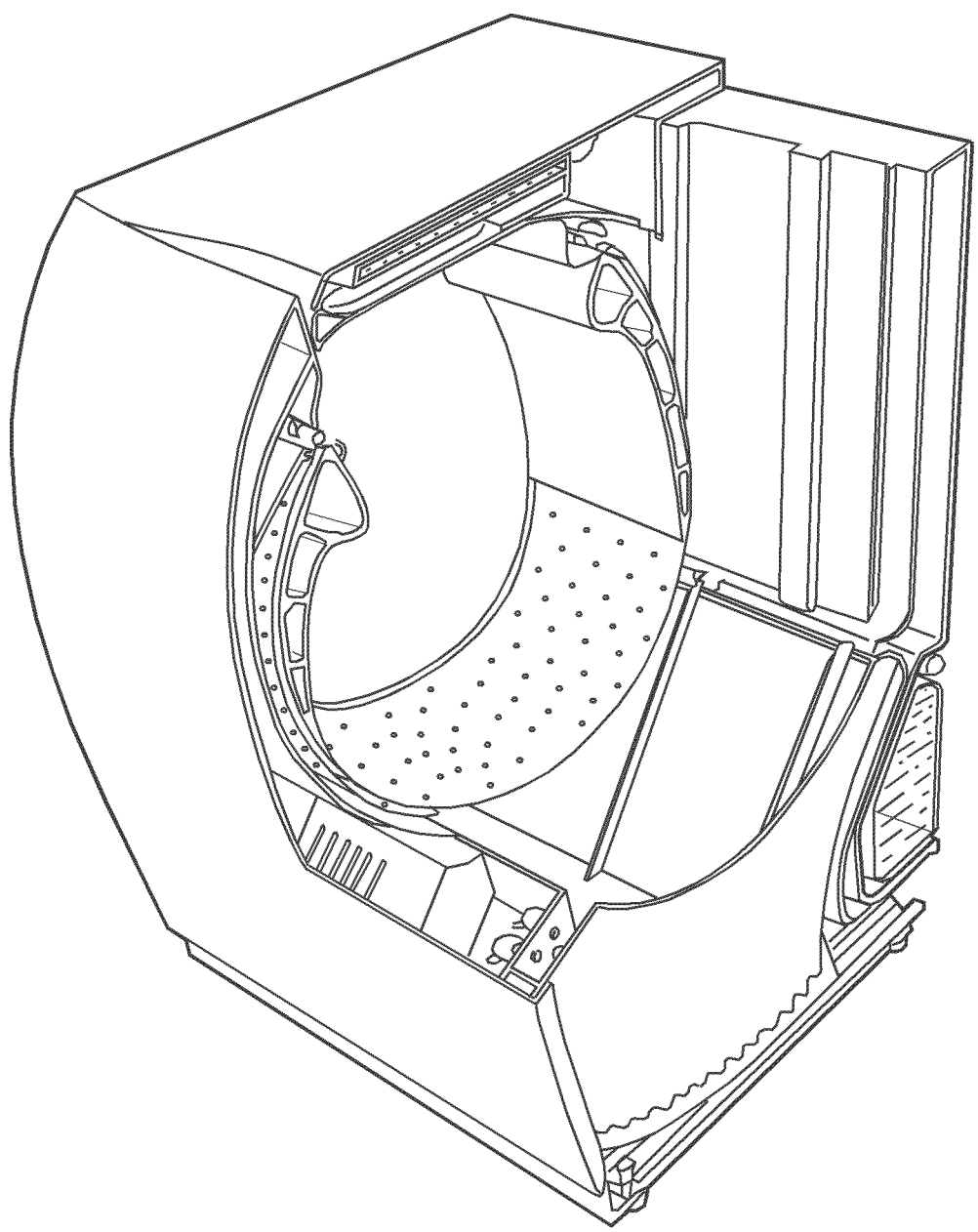
FIG. 14 shows a diagrammatic view of a horizontal axis laundry machine with tilt access that may incorporate the rotor and/or motor according to the present invention.

FIG. 14 shows a tilt loading horizontal axis washing machine. The washing machine has an outer wrapper and a tub suspended within the outer wrapper. A rotating drum can rotate within the tub. Clothes can be introduced and taken from the rotating drum by tilting the drum. A motor, comprising a stator and rotor as previously described, is coupled to the rotating drum via a rotational shaft. The motor can be operated by a controller to spin and oscillate the rotating drum to carry out washing of clothes.

It will be appreciated that FIGS. 11 to 14 show just four examples of washing machines that could utilise a motor with a rotor produced in the manner described above. Other embodiments of the present invention could comprise other drying or washing machines be envisaged by those skilled in the art, operated by a motor as described above.

What is claimed is:

1. A rotor for a motor, comprising:
a hub for connecting the rotor to a shaft,
a perimeter portion for interacting with a motor stator to cause the rotor to rotate about an axis of rotation, and
a frame between the hub and the perimeter portion, wherein:
the frame is stamped from a sheet of metal to form legs, each leg extending outwardly towards the perimeter portion from an inner end attached to the hub, and
a first plurality of legs or a second plurality of legs or both are bent from the frame so that inner ends of the first plurality of legs are axially spaced from inner ends of the second plurality of legs.

2. The rotor as claimed in claim 1, wherein the hub is formed at least in part from plastics material overmoulding the inner ends of the legs together.

3. The rotor as claimed in claim 1, further comprising a reinforcing member for coupling the rotor to the shaft, wherein the hub is formed from plastics material overmoulding the inner ends of the legs and the reinforcing member together.

4. The rotor as claimed in claim 1, wherein the perimeter portion comprises a cylindrical side wall at a perimeter of the frame, the cylindrical side wall extending axially wherein the cylindrical side wall is formed either:
from plastics material overmoulded to the perimeter of the frame, or
integrally with the frame from sheet metal.

5. The rotor as claimed in claim 4, wherein the rotor is a brushless DC motor rotor and the cylindrical side wall is formed of plastics material which encapsulates a backing ring and magnets located at an inside of the backing ring.

6. The rotor as claimed in claim 5, further comprising a reinforcing member, for coupling the rotor to the shaft, the reinforcing member having a shoulder on an outer circumference thereof and a surface of the inner ring seated against the shoulder to position the reinforcing member axially with respect to the frame.

7. The rotor as claimed in claim 5, further comprising a reinforcing member, for coupling the rotor to the shaft, wherein an outer circumference of the reinforcing member bears against an inner circumference of the inner ring to position the reinforcing member radially with respect to the frame.

8. The rotor as claimed in claim 4, wherein the first plurality of legs and the second plurality of legs are circumferentially interleaved.

9. The rotor as claimed in claim 4, wherein the frame further comprises an inner ring joining the inner ends of the plurality of first legs together or the inner ends of the plurality of second legs together.

10. The rotor as claimed in claim 1, wherein the frame further comprises an outer ring joining together outer ends of the first and/or second plurality of legs.

11. A method of manufacturing a rotor having a hub for connecting the rotor to a shaft, a perimeter portion for interacting with a motor stator to cause the rotor to rotate about an axis of rotation, and a frame between the hub and the perimeter portion, the method comprising the steps of:

stamping the frame from a sheet of metal to form legs, each leg extending outwardly towards the perimeter portion from an inner end, bending a first plurality of legs or a second plurality of legs or both from the frame so that inner ends of the first plurality of legs are axially spaced from inner ends of the second plurality of legs, and attaching the hub to the inner ends of the legs.

12. The method as claimed in claim 11, wherein the attaching step comprises:

placing the inner ends of the legs in a mould cavity, injecting a plastics material into the cavity to overmould the inner ends of the legs together at the hub, and releasing the frame from the mould, the hub being formed at least from the plastics material.

13. The method as claimed in claim 11, wherein the attaching step comprises:

placing the inner ends of the legs and a reinforcing member for coupling the rotor to the shaft into a mould cavity, injecting plastics material into the cavity to overmould the inner ends of the legs and the reinforcing member together at the hub, and releasing the frame and the reinforcing member from the mould, the reinforcing member and plastics material forming the hub.

14. The method as claimed in claim 11, further comprising forming the perimeter portion as a cylindrical side wall at a perimeter of the frame, the cylindrical side wall extending axially wherein either:

the cylindrical side wall is formed from plastics material overmoulded to the perimeter of the frame, or the cylindrical side wall is formed integrally with the frame from sheet metal.

15. The method as claimed in claim 14, wherein the cylindrical side wall is formed from plastics material and the rotor is a brushless DC motor rotor, the method further comprising locating magnets at an inside of a backing ring and encapsulating the backing ring in the cylindrical side wall of plastics material.

16. The method as claimed in claim 11, wherein the bending step further comprises circumferentially interleaving the first plurality of legs and the second plurality of legs.

17. The method as claimed in claim 11, wherein the stamping step includes forming an inner ring joining the inner ends of the plurality of first legs together or the inner ends of the plurality of second legs together.

18. The method as claimed in claim 17, further comprising coupling a reinforcing member, for coupling the rotor to the shaft, to the inner ends of the legs, the reinforcing member having a shoulder on an outer circumference thereof and seating a surface of the inner ring against the shoulder to position the reinforcing member axially with respect to the frame.

19. The method as claimed in claim 17, further comprising coupling a reinforcing member, for coupling the rotor to the shaft, to the inner ends of the legs with an outer circumference of the reinforcing member bearing against an inner circumference of the inner ring to position the reinforcing member radially with respect to the frame.

20. The method as claimed in claim 11, wherein the stamping step further comprises forming an outer ring joining together outer ends of the first and/or second plurality of legs.

* * * * *